United States Patent [19]

Chow et al.

[11] 4,405,961

[45] Sep. 20, 1983

[54] THERMOELECTRIC COOLING OF MAGNETIC HEAD ASSEMBLIES

[75] Inventors: William W. Chow, Tucson; Davis S. Fields, Jr., Pima County; Paul Y. Hu, Pima County; Jorge L. Lopez, Pima County, all of Ariz.

[73] Assignee: International Business Machines, Armonk, N.Y.

[21] Appl. No.: 290,646

[22] Filed: Aug. 6, 1981

[51] Int. Cl.³ .................. F25B 21/02; G11B 5/10; G11B 5/40

[52] U.S. Cl. .................. 360/129; 360/110; 360/128; 62/3

[58] Field of Search .................. 360/110, 128, 129; 335/217, 300; 62/3

[56] References Cited

U.S. PATENT DOCUMENTS 3,319,238  5/1967  Jacoby .................. 340/174.1

4,230,907 10/1980 Hasselbach et al. .................. 179/1 E

FOREIGN PATENT DOCUMENTS 2126927 12/1971 Fed. Rep. of Germany ...... 360/110
52-11919  1/1977 Japan .................. 360/129
54-47618  4/1979 Japan .................. 360/129
56-47970  4/1981 Japan .................. 360/129

OTHER PUBLICATIONS

IBM Technical Disclosure Bulletin, vol. 23, No. 4, 9-80, p. 1659.

Primary Examiner—George G. Stellar
Attorney, Agent, or Firm—N. N. Kallman

[57] ABSTRACT

The temperature of a magnetic head assembly is reduced by active heat transfer accomplished by a thermoelectric cooling element positioned between and in contact with the head assembly housing and the head assembly. The housing serves as a heat sink from which thermal energy is diffused.

8 Claims, 2 Drawing Figures

THERMOELECTRIC COOLING OF MAGNETIC HEAD ASSEMBLIES

DESCRIPTION

TECHNICAL FIELD

This invention relates to a magnetic head assembly, and in particular, to a means for reducing the temperature of operating magnetic heads.

An object of this invention is to provide a magnetic head assembly wherein high temperatures produced during head operation are reduced.

Another object of this invention is to provide a magnetic head assembly in which performance is improved without deleterious thermal effects.

BACKGROUND ART

Presently known magnetic head assemblies incorporate read and write modules positioned within a common housing. To enhance operation of the recording and playback modes, it is desirable to increase current to the magnetic heads. Increased current tends to increase heat generation, which would adversely affect parameters such as permeability of magnetic materials used in the head, the resistance of any magnetoresistive (MR) films used as the read sensor, the integrity of thin films employed, and surface stresses among other things. To realize an improvement in head performance, the generated heat must be reduced in the head area, especially at the transducing gaps.

One approach to reduce heat during operation of a magnetic head is to reduce the width of the pulse of the write signal waveform. However, pulse width reduction is limited by the capability of the channel electronics, including the write drivers. Other approaches that provide passive compensation for reducing heat in a head assembly have been attempted, but not with optimum success.

CROSS-REFERENCE TO OTHER PATENT APPLICATION

Copending patent application Ser. No. 278,956 filed June 30, 1981, in behalf of A. J. Argumedo et al, and assigned to the same assignee, describes a magnetic head assembly having read and write modules in a nonmagnetic housing, of the type described in the present application.

BRIEF DESCRIPTION OF THE DRAWING

The invention will be described in detail with reference to the drawing in which.

DESCRIPTION OF A PREFERRED EMBODIMENT

Figure 1:
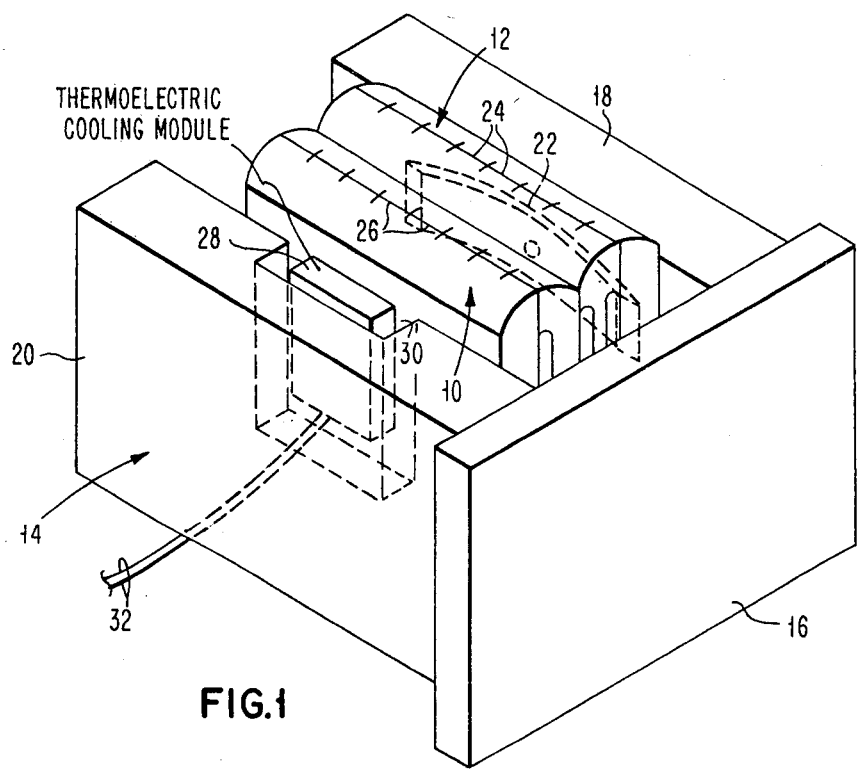
FIG. 1 is an isometric front view of a magnetic head assembly incorporating a thermoelectric cooling means, in accordance with this invention.
Figure 2:
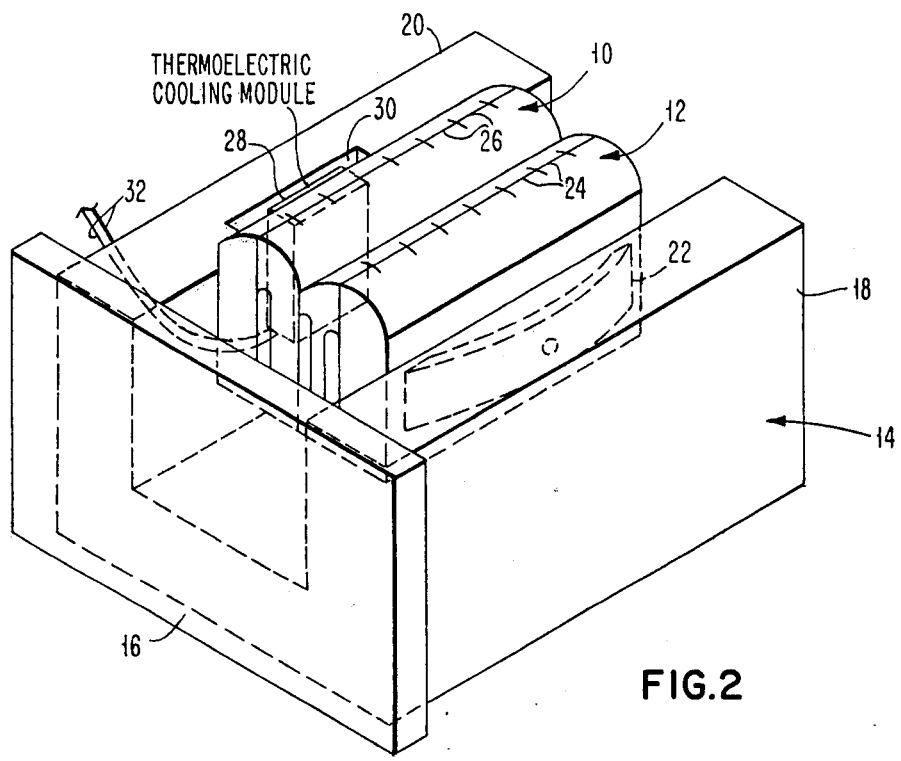
FIG. 2 is an isometric rear view of the magnetic head assembly of FIG. 1.

With reference to the drawing, FIGS. 1 and 2, a magnetic head assembly includes a write module 12 and a read module 10 securely positioned within a nonmagnetic housing 14, made of aluminum by way of example. The housing 14 is disposed on a baseplate 16, which is made of a nonmagnetic material such as aluminum.

The modules 10 and 12 comprise multi-element magnetic heads formed with ferrite and glass spacers that include transducing gaps, as is well known in the art.

The write and read modules are positioned side-by-side between the walls 18 and 20 of the housing, and are maintained in a fixed relationship by means of a clamp spring 22 that provides thermal compensation, as disclosed in the cross-referenced copending patent application, cited supra. The transducing gaps 24 and 26 of the multi-element read and write modules respectively project out of the planes of the top surfaces of the housing walls 18 and 20 and the baseplate 16, so that the head modules can interact in transducing relation with a magnetic medium (not shown).

In accordance with this invention, a thermoelectric cooling element 28 is seated in a rectangular slot 30 formed in the housing wall 20 adjacent to the read module 10. The thermoelectric cooling element 28 is secured to the slotted housing wall, by an epxoy adhesive for example. The cooling element has a hot junction on the side in contact with the housing wall and a cold junction that contacts the read module. Electric current for activating the cooling element is obtained from a power supply through wire leads 32.

The thermoelectric cooling element operates on the principle of thermoelectric (Peltier) cooling by actively transporting heat energy by means of current carriers. The flow of heat energy causes a net temperature gradient to appear so that the temperature at the cold junction is lowered and the temperature at the hot junction is increased.

The thermoelectric cooling element has the advantage of having no moving parts and is comparatively very small in size. An example of a commercially available module that may be used with this invention is the Melcor "Frigichip" (a registered trademark of Melcor) miniature ceramic module No. FC 0.6-66-06L.

During operation, the thermoelectric cooling element 28 effectively transfers heat energy from the head module assembly to the slotted housing wall 20. The clamp spring 22 also acts to transfer heat energy from the head module assembly to the housing wall. The housing structure thus serves as a heat sink, and in conjunction with baseplate 16 diffuses the heat to the ambient environment by natural convection. In this way, excessive heat is conducted from the read and write heads to the surroundings external to the housing and baseplate.

As a result of the temperature reduction of the heads during read and write operation, the problems attendant with thermal effects are eliminated or minimized. In one implementation of the invention, a 20° Centigrade reduction in temperature was realized while using only 250 milliamperes of current to the cooling element.

Also, if it is desired to maintain the operating temperature of the heads above the dew point, a thermally controlled feedback loop may be employed to sense the temperature of the head and to reduce the current and the cooling capacity of the thermoelectric cooling element accordingly.

As an alternative to the method of mounting the thermoelectric cooling unit, the cooling unit may be attached in thermal relation to the write or read module, or to both modules, in order to achieve optimum cooling efficiency.

What is claimed is:

1. A magnetic head assembly comprising:
   at least one magnetic head module;
   a thermoelectric cooling element thermally coupled to said head module; and a heat sink in thermal contact with said cooling element.

2. A magnetic head assembly as in claim 1, wherein said heat sink comprises a nonmagnetic thermally conductive housing in which said module is fixedly positioned, and said cooling element is in thermal contact with said housing and said module.

3. A magnetic head assembly as in claim 2, wherein said cooling element comprises a hot junction and a cold junction, said hot junction being in thermal contact with said housing and said cold junction being in thermal contact with said head module.

4. A magnetic head assembly as in claim 2, including a baseplate for supporting said housing, said baseplate serving as a heat diffuser.

5. A magnetic head assembly as in claim 2, including a clamping spring for maintaining said head module in fixed position within said housing, and for providing thermal compensation between said module and said housing.

6. A magnetic head assembly as in claim 5, wherein said at least one magnetic head module comprises a read head and a write head disposed in side-by-side relation within said housing.

7. A magnetic head assembly as in claim 6, wherein said read module is positioned adjacent to said cooling element and said write module is positioned adjacent to said clamping spring.

8. A magnetic head assembly as in claim 6, wherein said read and write head modules include a multiplicity of transducing gaps, said gaps projecting beyond said housing so that said heads may interact in transducing relation with a magnetic medium.

* * * * *